(12) United States Patent
Ito et al.

(10) Patent No.: US 11,110,768 B2
(45) Date of Patent: Sep. 7, 2021

(54) DAMPER MOUNT

(71) Applicant: HONDA MOTOR CO., LTD., Tokyo (JP)

(72) Inventors: Yuho Ito, Wako (JP); Toshio Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 10 days.

(21) Appl. No.: 16/787,665

(22) Filed: Feb. 11, 2020

(65) Prior Publication Data

US 2020/0262260 A1    Aug. 20, 2020

(30) Foreign Application Priority Data

Feb. 15, 2019    (JP) .............................. JP2019-025088

(51) Int. Cl.
| | |
|---|---|
| *B60G 13/00* | (2006.01) |
| *B60G 13/08* | (2006.01) |
| *B60G 15/06* | (2006.01) |
| *F16F 9/54* | (2006.01) |
| *F16F 15/08* | (2006.01) |
| *F16F 1/36* | (2006.01) |

(Continued)

(52) U.S. Cl.
CPC ............ *B60G 13/003* (2013.01); *F16F 1/361* (2013.01); *F16F 9/54* (2013.01); *F16F 15/03* (2013.01); *B60G 2204/128* (2013.01); *B60G 2204/41* (2013.01); *F16F 15/08* (2013.01)

(58) Field of Classification Search
CPC .............. B60G 13/001; B60G 13/003; B60G 2204/128; B60G 2204/41; B60G 13/08; B60G 15/068; F16F 9/54; F16F 1/361; F16F 15/023; F16F 15/03; F16F 15/04; F16F 15/085; F16F 2236/103

See application file for complete search history.

(56) References Cited

U.S. PATENT DOCUMENTS

| | | | |
|---|---|---|---|
| 9,616,727 B2 | 4/2017 | Ogawa et al. | |
| 2016/0152108 A1* | 6/2016 | Ogawa ................... | B60G 11/22 267/220 |

(Continued)

FOREIGN PATENT DOCUMENTS

| | | | | |
|---|---|---|---|---|
| CN | 109154355 A | * | 1/2019 | ............ F16F 7/1011 |
| JP | 2015024672 A | | 2/2015 | |

(Continued)

OTHER PUBLICATIONS

Description Translation for CN 109154355 from Espacenet (Year: 2019).*

*Primary Examiner* — Paul N Dickson
*Assistant Examiner* — Daniel M. Keck
(74) *Attorney, Agent, or Firm* — Armstrong Teasdale LLP

(57) ABSTRACT

Provided is a damper mount (1, 101, 201) configured to be interposed between a damper (11) of a wheel suspension device and a vehicle body (9). The damper mount includes: an annular outer member (22) fixed to the vehicle body; an annular inner member (21) fixed to the damper, one of the outer member and the inner member being received in another of the outer member and the inner member; a first magneto-elastic member (24) radially interposed between the inner member and the outer member; and a coil (25) configured to apply a magnetic flux to the first magneto-elastic member.

7 Claims, 5 Drawing Sheets

(51) Int. Cl.
*F16F 15/03* (2006.01)
*F16F 15/023* (2006.01)

(56) References Cited

U.S. PATENT DOCUMENTS

2017/0291464 A1* 10/2017 Isaac .................... B60G 13/003
2017/0328433 A1* 11/2017 Terashima .............. F16F 15/03

FOREIGN PATENT DOCUMENTS

| JP | 2015121254 A | * | 7/2015 | .............. F16F 1/361 |
| WO | WO-0067851 A2 | * | 11/2000 | .............. D06F 37/20 |
| WO | WO-2012026332 A1 | * | 3/2012 | .............. F16F 1/361 |
| WO | WO-2018008425 A1 | * | 1/2018 | ........... B60K 5/1283 |

* cited by examiner

DAMPER MOUNT

TECHNICAL FIELD

The present invention relates to a damper mount configured to be interposed between a damper of a wheel suspension device and a vehicle body.

BACKGROUND ART

To reduce the vibration transmitted from a wheel to a vehicle body via a wheel suspension device, a damper mount is often placed between the damper of the wheel suspension device and the vehicle body.

When the stiffness of the damper mount is low, transmission of vibration from the wheel to the vehicle body is effectively reduced so that the cabin is protected from noise and vibration, but the effective stiffness of the damper is reduced so that the handling and the flat ride performance of the vehicle may be impaired. Conversely, if the stiffness of the damper mount is high, the handling and the flat ride performance of the vehicle are ensured, but transmission of vibration from the wheel to the vehicle body may not be adequately reduced so that the cabin may not be favorably protected from noise and vibration.

Thus, the damper mount has mutually conflicting requirements. To overcome this problem, it has been proposed to use a variable elastic modulus member such as a magneto-elastic member in the damper mount, and change the stiffness of the damper mount depending on the operating condition of the vehicle. See JP2015-24672A, for instance.

In a magneto-elastic member, magnetic particles are typically dispersed in polymer material, and when subjected to a magnetic flux, the magnetic particles are aligned in the direction of the magnetic flux so that an internal stress is created in the magneto-elastic member. As a result, the stiffness of the magneto-elastic member against shear deformation changes. By using this property, the magneto-elastic member can be advantageously used for varying the stiffness of the damper mount both quickly and efficiently.

According to the prior art, the magnetic flux is applied to the magneto-elastic member in the direction of the elongation and compression deformation, and use is made of the changes in the elastic modulus of the magneto-elastic member with respect to the elongation and compression deformation of the magneto-elastic member, instead of the shear deformation of the magneto-elastic member.

SUMMARY OF THE INVENTION

In view of such a problem of the prior art, a primary object of the present invention is to provide a damper mount that can control the stiffness thereof by making use of the desirable elastic property of the magneto-elastic member in shear deformation.

To achieve such an object, one embodiment of the present invention provides a damper mount (1, 101, 201) configured to be interposed between a damper (11) of a wheel suspension device and a vehicle body (9), comprising: an annular outer member (22) configured to be fixed to the vehicle body; an annular inner member (21) configured to be fixed to the damper, one of the outer member and the inner member being received in another of the outer member and the inner member; a first magneto-elastic member (24) radially interposed between the inner member and the outer member; and a coil (25) configured to apply a magnetic flux to the first magneto-elastic member.

Thereby, the stiffness of the damper mount can be controlled in an efficient manner by making use of the elastic characteristics of the magneto-elastic member typically made of magneto-elastic polymer against shear deformation. Thus, the stiffness of the damper mount can be increased when the handling and the flat ride performance of the vehicle are desired, and the stiffness of the damper mount can be decreased when the vibration and noise performance of the vehicle is desired. As a result, the handling and the vibration and noise performance of the vehicle can be ensured at the same time.

Preferably, the inner member (21) includes a tubular portion (35) configured to receive a bolt (31) of the damper (11) therein and a pair of radial flanges (36) extending radially from the tubular portion in an axially spaced apart relationship, the first magneto-elastic member consisting of two parts each radially interposed between an outer peripheral part of a corresponding one of the flanges and an opposing inner circumferential surface of the outer member, and wherein the coil (25) is wound around a part of the tubular portion located axially between the flanges, the inner member and the outer member being made of high magnetic permeability material.

Thereby, the magnetic flux generated from the coil can be conducted to the first magneto-elastic member in an efficient manner.

Preferably, the first magneto-elastic member is configured to increase stiffness against shear deformation when a magnetic flux directed in a radial direction is applied to the first magneto-elastic member by the coil.

Thereby, the stiffness of the damper mount can be controlled in an efficient manner by making use of the elastic characteristics of the first magneto-elastic member against shear deformation. The outer peripheral part of each flange of the inner member may be enlarged in an axial direction away from the other flange so as to define an enlarged outer circumferential surface so that the magnetic flux can be conducted to the first magneto-elastic member over an increased cross sectional area.

Preferably, the damper mount further comprises a first constant elastic modulus member (23) radially interposed between the inner member or the coil and the outer member, and axially interposed between the two parts of the first magneto-elastic member.

Thereby, the elastic characteristics of the damper mount can be further enhanced by the cooperation of the first magneto-elastic member and the first constant elastic modulus member.

Preferably, the damper mount further comprises a support member (102) fixedly connected to the vehicle body and axially opposing the flanges, and a second constant elastic modulus member (104) axially interposed between the support member and the opposing flange. Typically, the support member includes a pair of flanges axially interposing the flanges of the inner member therebetween in a spaced apart relationship, and the second constant elastic modulus member consists of two parts each interposed between a corresponding one of the flanges of the support member and the opposing flange of the inner member.

Thereby, the stiffness of the damper mount can be selected in an even more favorable manner.

Preferably, the damper mount further comprises a support member fixedly connected to the vehicle body and axially opposing the flanges, and a second magneto-elastic member axially interposed between the support member and the opposing flange. Typically, the support member includes a pair of flanges axially interposing the flanges of the inner member therebetween in a spaced apart relationship, and the second magneto-elastic member consists of two parts each interposed between a corresponding one of the flanges of the support member and the opposing flange of the inner member.

Thereby, the stiffness of the damper mount can be controlled in an even more favorable manner.

The present invention thus provides a damper mount that can control the stiffness thereof by making use of the desirable elastic property of the magneto-elastic member in shear deformation.

BRIEF DESCRIPTION OF THE DRAWING(S)

DESCRIPTION OF THE PREFERRED EMBODIMENT(S)

Preferred embodiments of the present invention are described in the following with reference to the appended drawings.

First Embodiment

Figure 1:
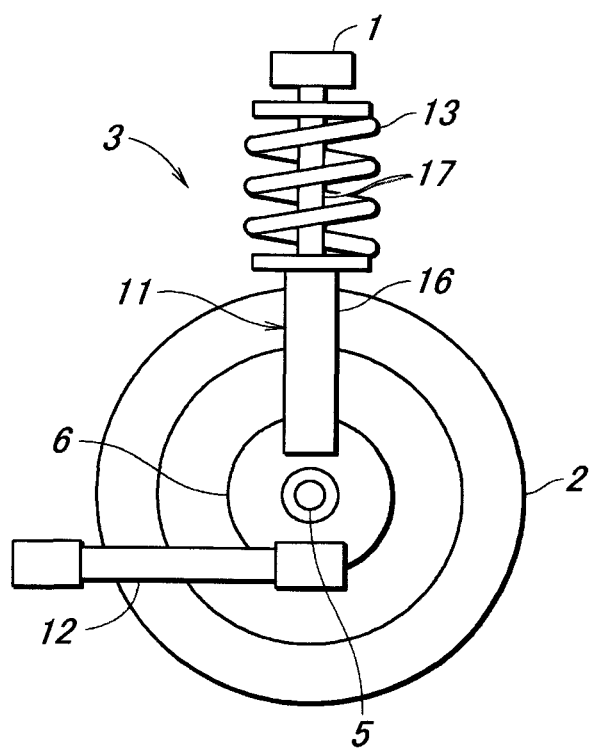
FIG. 1 is a side view of a damper mount according to a first embodiment of the present invention as mounted to a vehicle.

FIG. 1 is a side view of a damper mount according to a first embodiment of the present invention as mounted to a vehicle.

FIG. 1 shows a wheel suspension device 3 for a wheel 2, and the wheel suspension device 3 includes a damper 11, a suspension arm 12 and a spring 13. The damper 11 consists of a hydraulic cylinder damper having a cylinder tube 16 and a piston rod 17 connected to a piston (not shown in the drawings) received in the cylinder tube 16 and extending out of the upper end of cylinder tube 16. The upper end of the piston rod 17 is connected to a vehicle body 9 (FIG. 2), and the lower end of the cylinder tube 16 is connected to a hub 6 supporting an axle 5 of the wheel 2. The damper mount 1 is interposed between the upper end of the piston rod 17 and the vehicle body 9.

Figure 2:
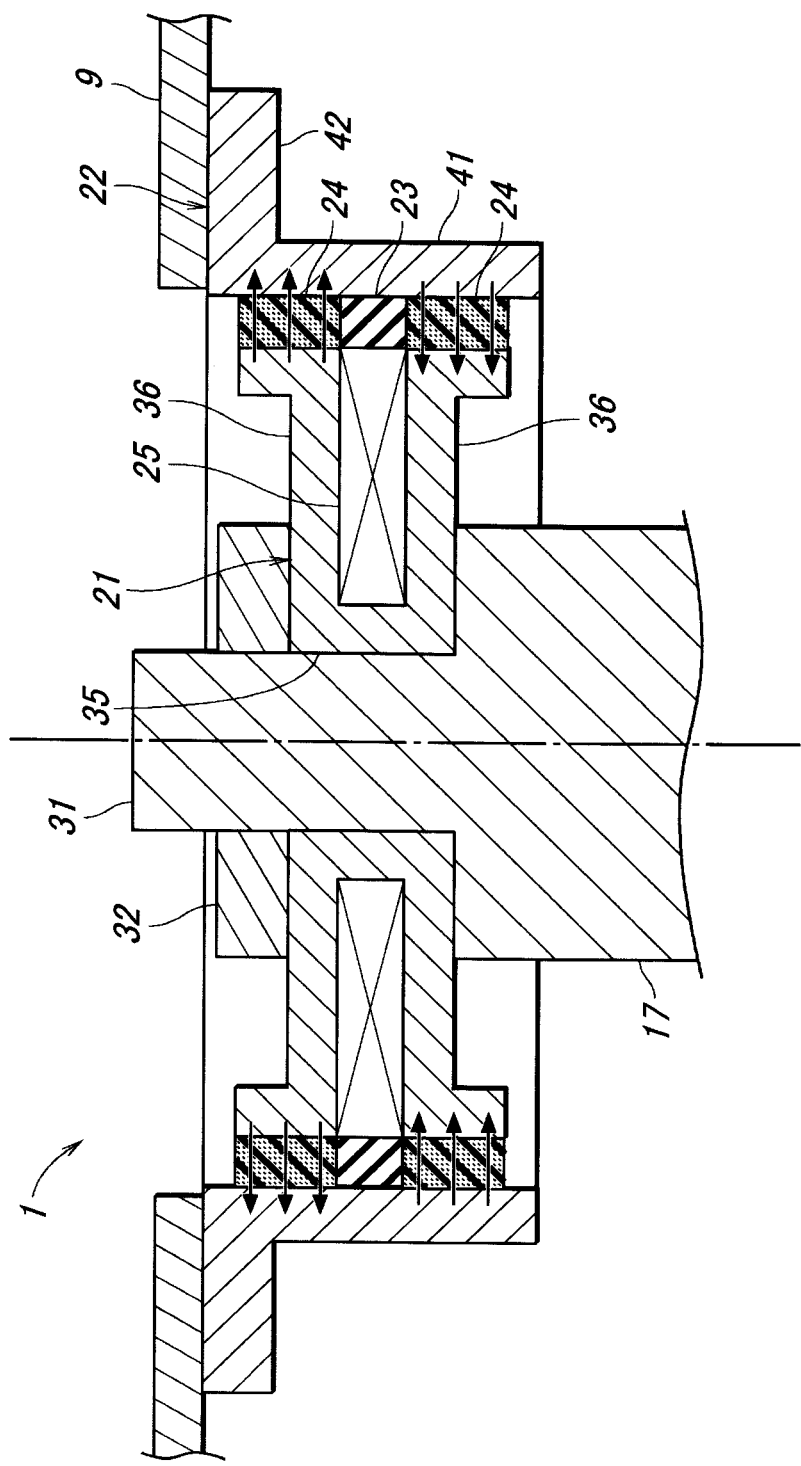
FIG. 2 is a sectional side view of the damper mount.

FIG. 2 is a sectional side view of the damper mount 1.

The damper mount 1 includes an inner member 21, an outer member 22, a first constant elastic modulus member 23, a first magneto-elastic member 24, and a coil 25.

The inner member 21 is formed in an annular shape, and includes a tubular portion 35 and a pair of flanges 36 extending radially outward from either axial end of the tubular portion 35. In the illustrated embodiment, the outer peripheral part of each flange 36 is enlarged in the axial direction away from the other flange 36 so as to define an enlarged outer circumferential surface. The upper end of the piston rod 17 of the damper 11 is provided with a threaded portion 31 having a smaller diameter than the main part of the piston rod 17, and the threaded portion 31 is passed through the central bore of the inner member 21. A nut 32 is threaded onto the part of the threaded portion 31 protruding from the central bore of the inner member 21 so that the inner member 21 is fixedly secured to the piston rod 17 by being firmly interposed between the nut 32 and an annular shoulder surface of the piston rod 17 defined at the base end of the threaded portion 31. The inner member 21 is formed of a high magnetic permeability material (such as iron-based material).

The outer member 22 is formed in an annular shape, and includes a cylindrical outer peripheral wall portion 41 that surrounds the inner member 21, and a flange 42 extending radially outward from the upper axial end of the peripheral wall portion 41. The outer member 22 thus has an L-shaped cross section. The inner member 21 is received inside the peripheral wall portion 41. The inner member 21 and the outer member 22 are disposed substantially coaxially with respect to the piston rod 17 of the damper 11. The flange 42 is attached to the vehicle body 9. The outer member 22 is formed of a magnetic material (such as iron-based material).

The first constant elastic modulus member 23 has an annular shape, and is radially interposed between the inner member 21 and the outer member 22. The coil 25 is wound around a part of the tubular portion 35 disposed axially between the flanges 36. More specifically, the first constant elastic modulus member 23 is radially interposed between the outer periphery of the coil 25 and the inner peripheral surface of the peripheral wall portion 41 of the outer member 22. The first constant elastic modulus member 23 is made of a polymer material such as natural rubber and urethane.

The first magneto-elastic member 24 has an annular shape, and is radially interposed between the inner member 21 and the outer member 22. More specifically, the first magneto-elastic member 24 consists of two parts each radially interposed between the outer periphery of a corresponding one of the flanges 36 and the opposing inner peripheral surface of the peripheral wall portion 41 of the outer member 22.

The first magneto-elastic member 24 is made of a magnetic elastomer (magnetic viscoelastic elastomer) material which is obtained by dispersing magnetic particles (for example, iron powder) in a base material consisting of a silicone-based elastomer. When a magnetic flux directed in the radial direction is applied to the first magneto-elastic member 24, the magnetic particles are aligned along the magnetic flux so that an internal stress is created, and this in effect increases the stiffness of the first magneto-elastic member 24 against shear deformation thereof.

In this embodiment, the outer peripheral surface of the coil 25 is substantially flush with the outer circumferential surfaces of the flanges 36.

In the damper mount 1 configured as described above, when a current is supplied from a control unit (not shown in the drawings) to the coil 25, the magnetic flux generated from the coil 25 passes through the first magneto-elastic member 24, and the stiffness of the first magneto-elastic member 24 increases. The first magneto-elastic member 24 is low in stiffness when no current is passed through the coil 25, and is high in stiffness when electric current is passed through the coil 25. Preferably, the stiffness of the first magneto-elastic member 24 changes substantially in proportion to the intensity of the electric current supplied to the coil 25. Thus, the stiffness of the first magneto-elastic member 24 can be controlled by adjusting the electric current of the coil 25.

In the present embodiment, since the inner member 21 and the outer member 22 are made of a high magnetic permeability material (such as iron-based material), the magnetic flux generated from the coil 25 is efficiently guided to the first magneto-elastic member 24, and the leakage of the magnetic flux leakage can be minimized.

In the present embodiment, since the first magneto-elastic member 24 is radially interposed between the inner member 21 and the outer member 22, an external force acting in the axial direction of the damper mount 1 causes an elastic shear deformation of the first magneto-elastic member 24. The magnetic particles dispersed in the first magneto-elastic member 24 are generally aligned in the radial direction, and the magnetic flux generated by the coil 25 and applied to the first magneto-elastic member 24 extends in the radial direction. Since the first magneto-elastic member 24 demonstrates particularly favorable elastic characteristics when undergoing a shear deformation, the stiffness of the first magneto-elastic member 24 can be controlled both in an efficient and responsive manner.

When the vehicle handling (including the steering stability) and the flat ride performance is desired to be improved, the stiffness of the damper mount 1 may be increased so that the effective damping factor of the damper 11 is prevented from being reduced. When the vibration and noise performance is desired to be improved, the stiffness of the damper mount 1 may be reduced so that the vibration transmitted from the wheel 2 to the vehicle body may be reduced, and the noise and vibration in the passenger compartment may be thereby reduced. Thus, the vehicle handling and the vibration and noise performance can be both improved.

Figure 3A:
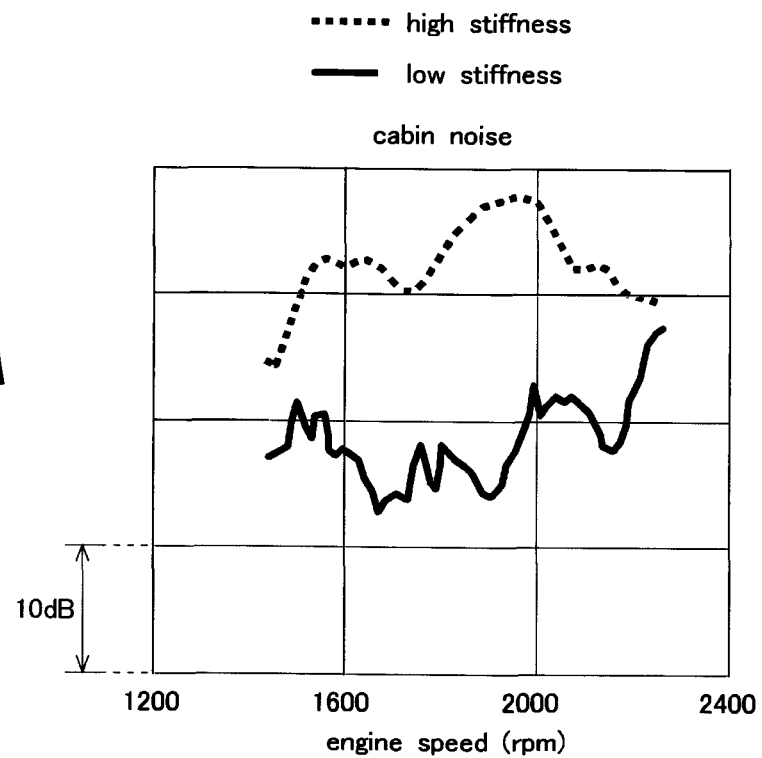
FIG. 3A is a graph showing the relationship between the cabin noise and the engine rotational speed when a magneto-elastic member of the damper mount is in a high stiffness condition and a low stiffness condition.
Figure 3B:
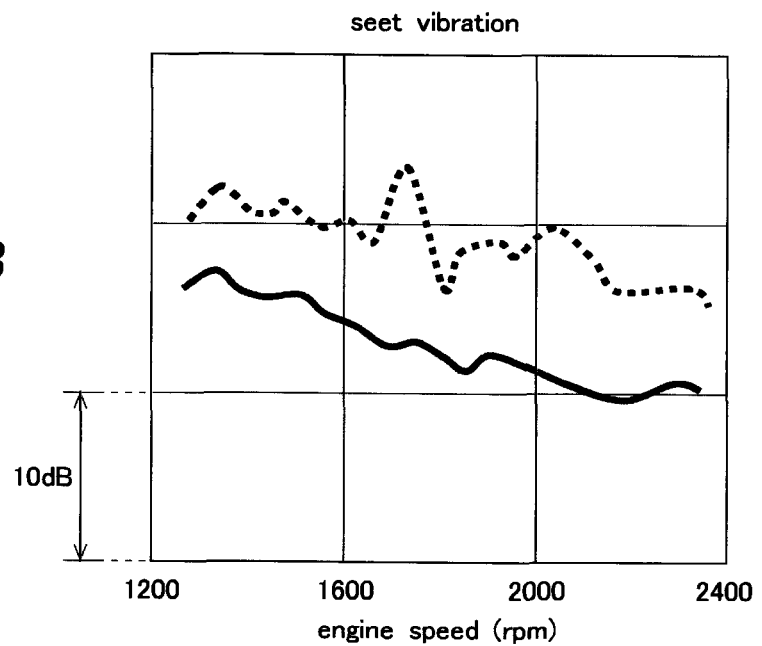
FIG. 3B is a graph showing the relationship between the seat vibration and the engine rotational speed when the magneto-elastic member is in a high stiffness condition and a low stiffness condition.

FIG. 3A is a graph showing the relationship between the cabin noise and the engine rotational speed in a solid line and a dotted line when the first magneto-elastic member 24 is in a high stiffness condition and a low stiffness condition, respectively. FIG. 3B is a graph showing the relationship between the seat vibration and the engine rotational speed in a solid line and a dotted line when the first magneto-elastic member 24 is in a high stiffness condition and a low stiffness condition, respectively.

As shown in FIG. 3A, the cabin noise level is lower when the first magneto-elastic member 24 is low in stiffness than when the first magneto-elastic member 24 is high in stiffness substantially over the entire engine rotational speed range. As shown in FIG. 3B, the seat vibration level (first order vibration mode) is also lower when the first magneto-elastic member 24 is low in stiffness than when the first magneto-elastic member 24 is high in stiffness substantially over the entire engine rotational speed range.

Second Embodiment

Figure 4:
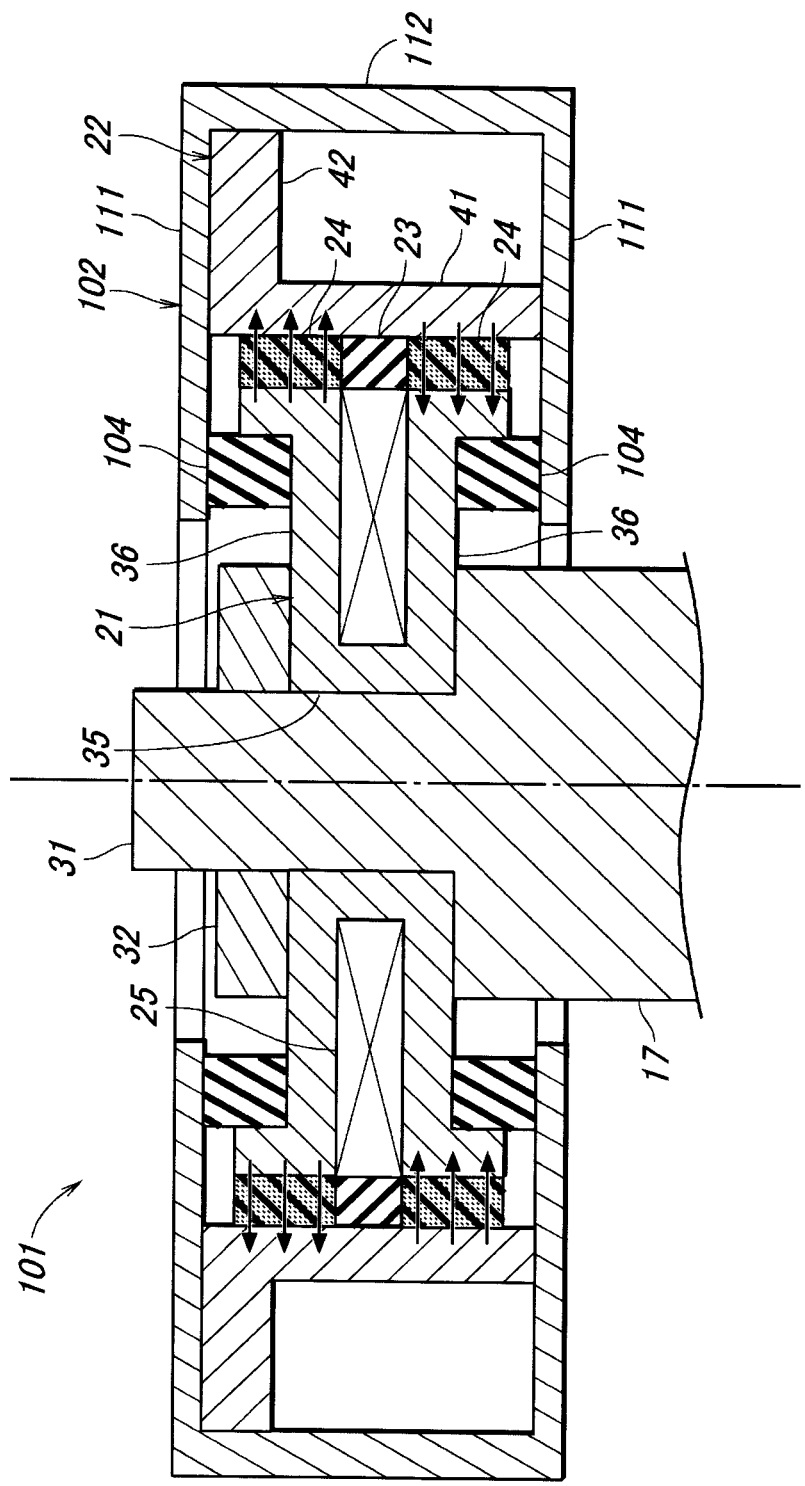
FIG. 4 is a view similar to FIG. 2 showing a damper mount of a second embodiment.

A damper mount 101 according to the second embodiment of the present invention is described in the following with reference to FIG. 4 which is a cross-sectional view of the damper mount 101.

In the present embodiment, the damper mount 101 is similar to the damper mount 1 of the first embodiment, but additionally includes a support member 102, and a second constant elastic modulus member 104. The second constant elastic modulus member 104 is made of polymer material such as natural rubber, similarly as the first constant elastic modulus member 23.

The support member 102 is fixedly secured to the vehicle body 9, and formed in an annular shape. More specifically, the support member 102 includes a cylindrical portion 112, and a pair of flanges 111 projecting radially inward from either axial end of the cylindrical portion 112. Thus, the support member 102 has a U-shaped cross section. The flanges 111 of the support member 102 axially oppose the respective flanges 36 of the inner member 21 from outer side. The cylindrical portion 112 surrounds the outer member 22. Thus, the support member 102 receives the outer member 22 and a radially outer part of the inner member 21. The support member 102 is thus disposed substantially coaxially with respect to the inner member 21 and the outer member 22.

The first constant elastic modulus member 23 and the first magneto-elastic member 24 are similar to those in the first embodiment.

The second constant elastic modulus member 104 consists of two parts each having an annular shape and axially interposed between a corresponding one of the flanges 36 of the inner member 21 and the opposing flange 111 of the support member 102.

Thus, in the damper mount 101 of the second embodiment, the second constant elastic modulus member 104 is axially interposed between the inner member 21 and the support member 102 so as to undergo an elongation and compression deformation in response to the axial movement of the piston rod 17 relative to the support member 102 or the vehicle body 9.

Third Embodiment

Figure 5:
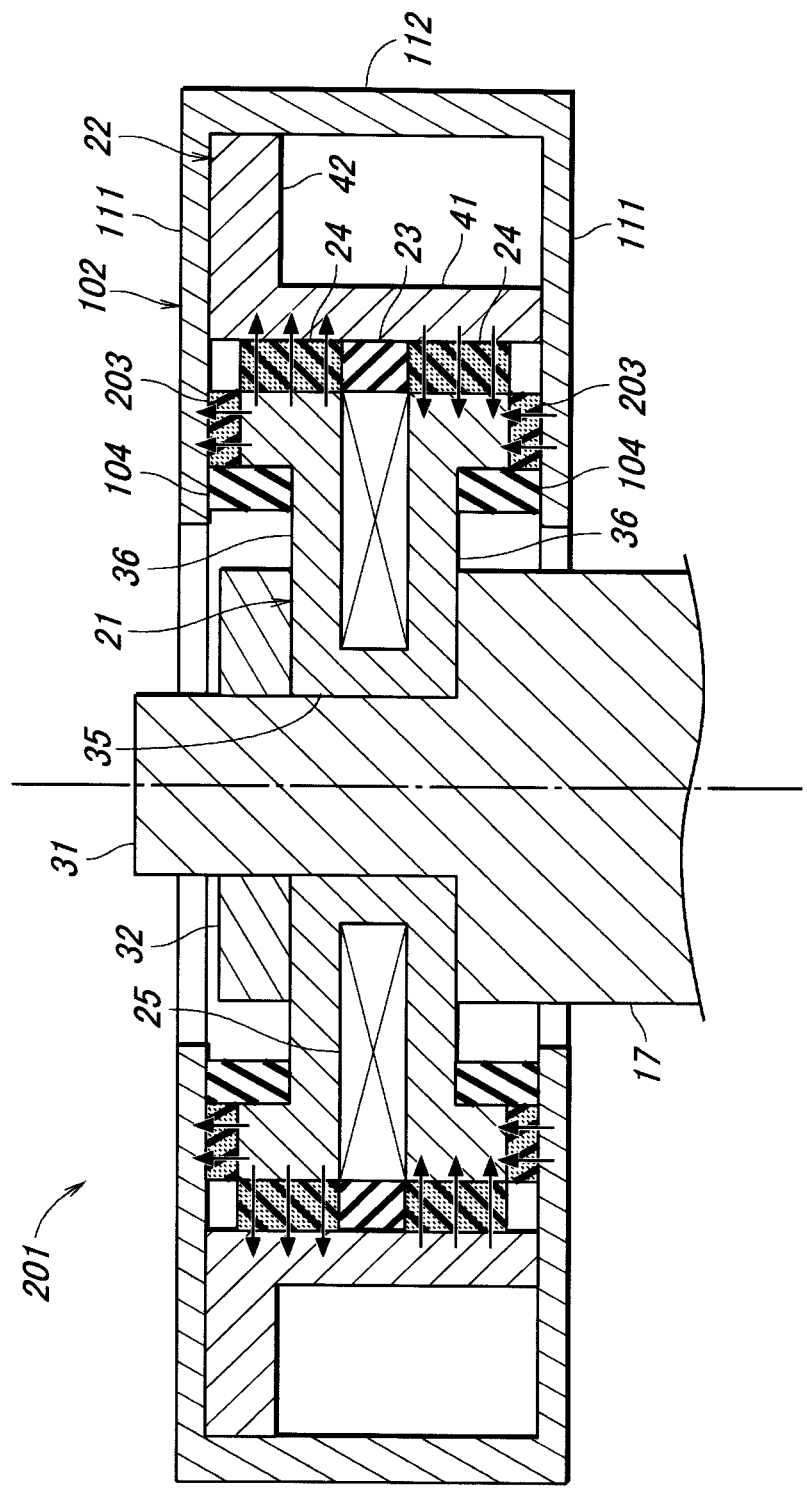
FIG. 5 is a view similar to FIG. 2 showing a damper mount of a third embodiment.

A damper mount 201 according to the third embodiment of the present invention is described in the following with reference to FIG. 5 which is a cross sectional view of the damper mount 201.

The damper mount 201 includes a second magneto-elastic member 203 in addition to the first magneto-elastic member 24. The second magneto-elastic member 203 is made of magnetic elastomer material similarly as the first magneto-elastic member 24.

The first magneto-elastic member 24, the first constant elastic modulus member 23, the second constant elastic modulus member 104, and the support member 102 are similar to those in the second embodiment.

In the first magneto-elastic member 24, the magnetic flux generated by the coil 25 passes in the radial direction so that the elastic modulus against the shear deformation of the first magneto-elastic member 24 can be adjusted by varying the electric current flowing through the coil 25. Thus, the axial stiffness of the damper mount 201 can be controlled as desired.

The second magneto-elastic member 203 consists of two parts each having an annular shape and axially interposed between a corresponding one of the flanges 36 of the inner member 21 and the opposing flange 111 of the support member 102. The second magneto-elastic member 203 is thus provided between the inner member 21 and the support member 102 so as to undergo an elongation and compression deformation against the axial movement of the piston rod 17 relative to the support member 102 or the vehicle body 9.

The magnetic flux generated from the coil 25 passes axially through the second magneto-elastic member 203 so that the stiffness of the second magneto-elastic member 203 against the shear deformation thereof caused by the lateral or radial movement of the piston rod 17 relative to the support member 102 or the vehicle body 9 can be favorably controlled.

The present invention has been described in terms of specific embodiments, but is not limited by such embodi-

The invention claimed is:

1. A damper mount configured to be interposed between a damper of a wheel suspension device and a vehicle body, comprising:
   an annular outer member configured to be fixed to the vehicle body;
   an annular inner member configured to be fixed to the damper, one of the outer member and the inner member being received in another of the outer member and the inner member;
   a first magneto-elastic member radially interposed between the inner member and the outer member; and
   a coil configured to apply a magnetic flux to the first magneto-elastic member,
   wherein the inner member includes a tubular portion configured to receive a bolt of the damper therein and a pair of radial flanges extending radially from the tubular portion in an axially spaced apart relationship, the first magneto-elastic member consisting of two parts each radially interposed between an outer peripheral part of a corresponding one of the flanges and an opposing inner circumferential surface of the outer member, and wherein the coil is wound around a part of the tubular portion located axially between the flanges, the inner member and the outer member being made of high magnetic permeability material,
   the damper mount further comprising a support member fixedly connected to the vehicle body and axially opposing the flanges, and a second magneto-elastic member axially interposed between the support member and the opposing flange.

2. The damper mount according to claim 1, wherein the first magneto-elastic member is configured to increase stiffness against shear deformation when a magnetic flux directed in a radial direction is applied to the first magneto-elastic member by the coil.

3. The damper mount according to claim 1, further comprising a first constant elastic modulus member radially interposed between the inner member or the coil and the outer member, and axially interposed between the two parts of the first magneto-elastic member.

4. The damper mount according to claim 1, further comprising a second constant elastic modulus member axially interposed between the support member and the opposing flange.

5. The damper mount according to claim 4, wherein the support member includes a pair of flanges axially interposing the flanges of the inner member therebetween in a spaced apart relationship, and the second constant elastic modulus member consists of two parts each interposed between a corresponding one of the flanges of the support member and the opposing flange of the inner member.

6. The damper mount according to claim 1, wherein the support member includes a pair of flanges axially interposing the flanges of the inner member therebetween in a spaced apart relationship, and the second magneto-elastic member consists of two parts each interposed between a corresponding one of the flanges of the support member and the opposing flange of the inner member.

7. A damper mount configured to be interposed between a damper of a wheel suspension device and a vehicle body, comprising:
   an annular outer member configured to be fixed to the vehicle body;
   an annular inner member configured to be fixed to the damper, one of the outer member and the inner member being received in another of the outer member and the inner member;
   a first magneto-elastic member radially interposed between the inner member and the outer member; and
   a coil configured to apply a magnetic flux to the first magneto-elastic member,
   wherein the inner member includes a tubular portion configured to receive a bolt of the damper therein and a pair of radial flanges extending radially from the tubular portion in an axially spaced apart relationship, the first magneto-elastic member consisting of two parts each radially interposed between an outer peripheral part of a corresponding one of the flanges and an opposing inner circumferential surface of the outer member, and wherein the coil is wound around a part of the tubular portion located axially between the flanges, the inner member and the outer member being made of high magnetic permeability material,
   wherein an outer peripheral part of each flange of the inner member is enlarged in an axial direction away from the other flange so as to define an enlarged outer circumferential surface.

* * * * *